United States Patent
Mills et al.

(10) Patent No.: US 6,848,654 B1
(45) Date of Patent: Feb. 1, 2005

(54) MODULAR OFFSET AISLE OVERHEAD CREW REST

(75) Inventors: Christopher J. Mills, Everett, WA (US); Mark W. Whalon, Everett, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/755,254

(22) Filed: Jan. 9, 2004

(51) Int. Cl.⁷ .............................................. B64D 11/00
(52) U.S. Cl. .............................. 244/118.5; 244/118.6; 105/314; 114/192
(58) Field of Search ................... 244/118.5, 118.6; 105/314, 315, 316; 114/192

(56) References Cited

U.S. PATENT DOCUMENTS

| | | | |
|---|---|---|---|
| 4,686,908 A | * | 8/1987 | Legrand ..................... 105/315 |
| 6,056,239 A | * | 5/2000 | Cantu et al. ............. 244/118.6 |
| 6,073,883 A | | 6/2000 | Ohlmann et al. |
| 6,464,169 B1 | | 10/2002 | Johnson et al. |
| 6,520,451 B1 | * | 2/2003 | Moore ..................... 244/118.5 |
| 6,536,710 B1 | | 3/2003 | Bobzien et al. |
| 6,581,876 B2 | * | 6/2003 | Cheung ................... 244/118.5 |
| 6,616,098 B2 | * | 9/2003 | Mills ....................... 244/118.5 |
| 6,659,225 B2 | * | 12/2003 | Olliges et al. ................ 182/97 |

* cited by examiner

*Primary Examiner*—J. Woodrow Eldred
(74) *Attorney, Agent, or Firm*—Harness Dickey & Pierce P.L.C.

(57) ABSTRACT

A mobile platform crew rest system includes a mobile platform having a plurality of frames and a longitudinal centerline. A plurality of bunk modules each have longitudinal module walls joined to a closed end wall. Each bunk module is individually supported by the frames. The bunk modules are configured in at least one of a first group of athwartship oriented modules and a second group of fore-aft oriented modules. A passageway is supported from the bunk modules. The passageway includes at least one segment and a passageway centerline longitudinally offset from the mobile platform longitudinal centerline.

32 Claims, 13 Drawing Sheets

US 6,848,654 B1

MODULAR OFFSET AISLE OVERHEAD CREW REST

FIELD OF THE INVENTION

The present invention relates in general to crew rest areas and more specifically to an aircraft overhead crew rest design and method of formation.

BACKGROUND OF THE INVENTION

Mobile vehicles including aircraft, trains, ships, etc. often provide rest areas for crew when the vehicle is intended for operation over lengthy time periods. Commercial aircraft in particular are required to provide crew rest spaces for aircraft which operate over extended periods of time. Common crew rest areas include bunks, chairs or seats, and lavatories for crew use. Aircraft crew rests are commonly separately provided for flight crew members and for flight attendants. Requirements for both crew rests vary, but components are often interchangeable. A common location on an aircraft for flight attendant crew rest areas is at the aft end of the aircraft, rearward of the aft passenger seating area and above the ceiling of the aft passenger seating area. This location is accessible using staircases and doorways or hatches.

Passenger carrier operators often request retrofit of crew rest areas, including adding to or expanding existing crew rest areas, or adding entirely new and independent crew rest areas. This is done to expand capacity by adding berths, increasing crew comfort and amenity levels by increasing berth dimensions, adding a feature such as a lavatory, or accommodating gender distinctions by adding dividers. It is often difficult to backfit existing vehicles, for example aircraft, with additional crew rest space due to items such as piping, structure, environmental control system ducting, flight control cabling, fire detection systems, stow-bin support structure and center stow-bins, and electrical cabling positioned adjacent to existent crew rest areas or areas where crew rests are desirable. Aircraft crew rests also commonly position passageways on the longitudinal centerline of the aircraft to maximize the usable space. Because the systems noted above and centrally positioned passageways normally use desirable crew rest space, these would all need to be moved to allow retrofitting a typical crew rest.

Another difficulty exists in aircraft, for example, having aft crew rest spaces positioned above the ceiling of passenger areas which are supported using ceiling structure. Because the ceiling structure is commonly optimized for the original crew rest space and weight, extending the crew rest volume, adding weight or adding passageway length can require significant modification to the existing passenger area ceiling design in addition to the impact on system piping, structure and cableways. Retrofitting a modified or new crew rest area as a unitary design is therefore impractical for many passenger vehicle designs.

SUMMARY OF THE INVENTION

In a preferred embodiment of the present invention, a modular crew rest system comprises a mobile platform having a plurality of frames and a longitudinal centerline. A plurality of bunk modules are each independently connected to the frames. A multi-section passageway is connectable to the bunk modules, the passageway having a passageway centerline longitudinally offset from the mobile platform longitudinal centerline and at least one flexible joint. The plurality of bunk modules is configurable in at least one of a first group of modules and a second group of modules.

In another preferred embodiment, a mobile platform crew rest system comprises a mobile platform having a plurality of frames and a longitudinal centerline. A plurality of bunk modules each have a plurality of longitudinal module walls joined to a closed end wall. A plurality of pairs of the frames operably support at least one of the bunk modules. A passageway has a plurality of segments and a passageway centerline longitudinally offset from the mobile platform longitudinal centerline. The passageway is operably connectable to the plurality of bunk modules, wherein the plurality of bunk modules is configurable in at least one of a first group of athwartship oriented modules and a second group of fore-aft oriented modules.

In still another preferred embodiment of the present invention, a method for forming a crew rest system for a mobile platform having a plurality of modular bunk modules comprises: locating each bunk module adjacent an outer structural envelope of the mobile platform; independently supporting each bunk module to the outer structural envelope of the mobile platform; movably joining an aisleway to the bunk modules to operably support the aisleway from only the plurality of bunk modules; and positioning at least one personnel access member adjacent the aisleway.

The features, functions, and advantages can be achieved independently in various embodiments of the present inventions or may be combined in yet other embodiments.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Modular crew rest designs of the present invention are described in reference to exemplary aircraft applications. Modular crew rest designs of the present invention are not intended to be limited to aircraft applications, but can be used in any mobile platform also including, but not limited to ships, trains, buses, etc.

Figure 1:
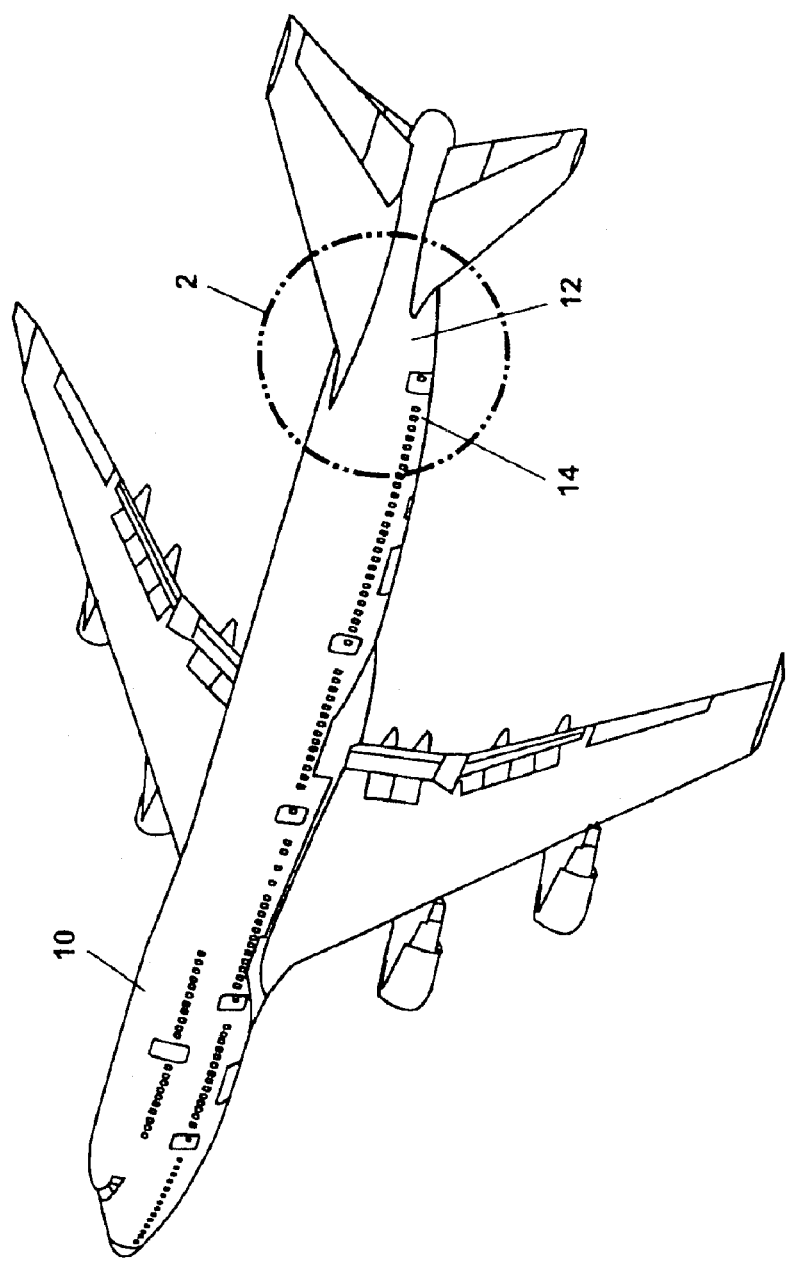
FIG. 1 is a perspective view of an aircraft identifying the approximate location for a modular crew rest of the present invention.

According to a preferred embodiment of the present invention, and referring to FIG. 1, an exemplary aircraft 10 includes an aft section 12 positioned aft of an aft passenger area 14. Aircraft 10 is an exemplary form of a "wide body" or extended range aircraft commonly used in extended or overseas flights. Crew rest areas for flight attendants are commonly provided in overhead spaces of aft section 12. These crew rest areas permit off duty personnel to rest.

Figure 2:
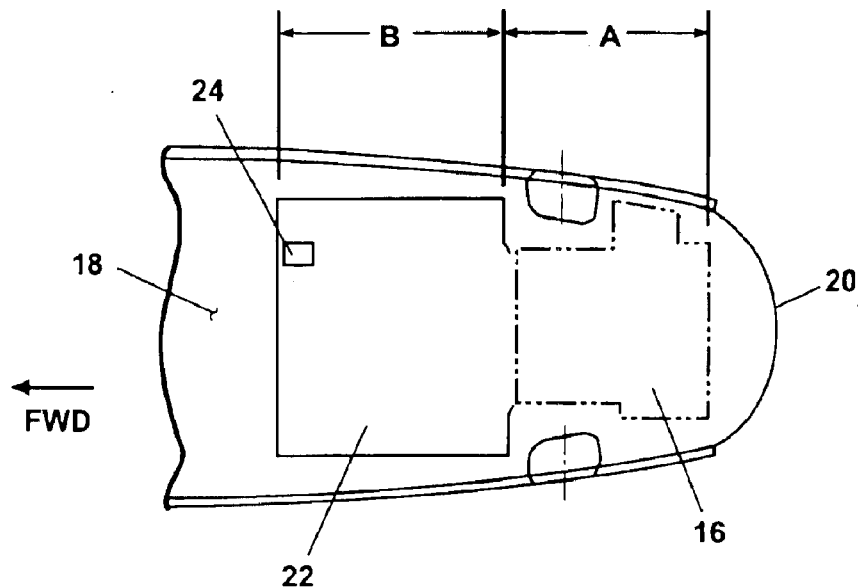
FIG. 2 is a partial sectional plan view through area 2 of FIG. 1.

Referring to FIG. 2, an overhead crew rest 16 known in the art is positioned within aft section 12, supported by and above a passenger area ceiling 18. Overhead crew rest 16 is commonly bounded on an aft end by an aft pressure hull 20. According to a preferred embodiment of the present invention, a modular crew rest area 22 is designated forward of overhead crew rest 16 and positioned above, but not supported from passenger area ceiling 18. Modular crew rest area 22 is preferably accessible either via existing passageways in overhead crew rest 16 and/or via one or more escape hatches 24.

Figure 3:
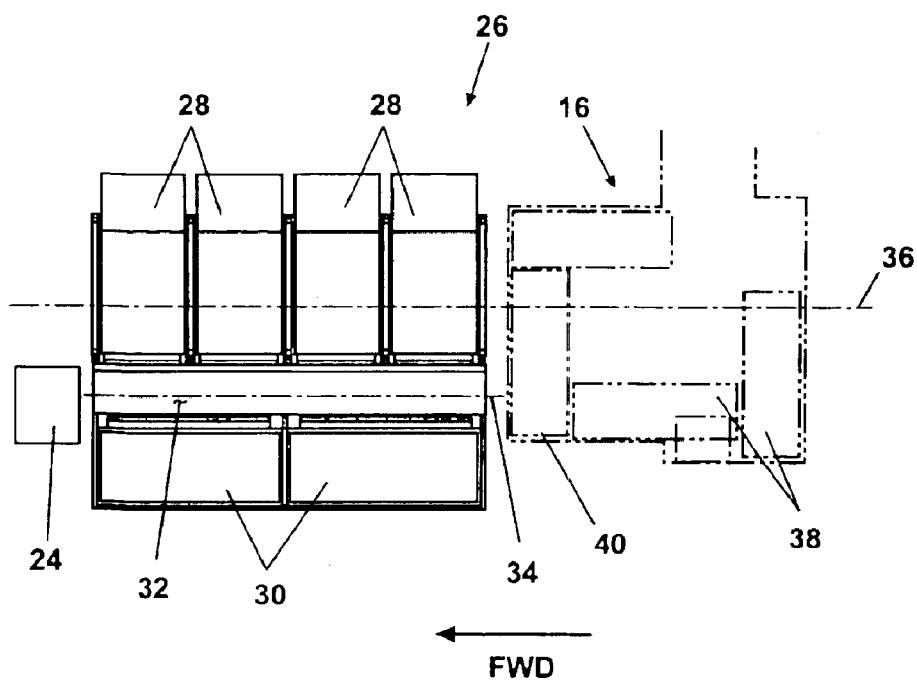
FIG. 3 is a plan view showing a modular crew rest of the present invention having a passageway centerline offset from an aircraft centerline.

As best seen in FIG. 3, in a preferred embodiment of the present invention a modular crew rest 26, having an exemplary quantity of four bunk modules 28 is positioned within modular crew rest area 22 (shown in FIG. 2). Bunk modules 28 are arranged opposite to a pair of bunk modules 30 and separated from bunk modules 30 by an offset aisleway 32. Offset aisleway 32 is aligned along an aisleway centerline 34. Aisleway centerline 34 is laterally offset from an aircraft centerline 36 to provide clearance to existing aircraft systems such as centerline stow-bins, electrical wiring and ducts.

Common crew rest areas have "narrow width" standard bunks of approximately 61–71 cm (24–28 in). These bunk sizes are less than optimal for extended vehicle operation where enhanced crew comfort is desirable. Bunk modules 28 and 30 therefore provide a generally larger bed area than existing standard bunks 38 (shown in phantom in overhead crew rest 16), to provide additional comfort for crew members. Each bunk module 28 is arranged generally transverse to aircraft centerline 36. In contrast, each bunk module 30 is arranged substantially parallel to aircraft centerline 36. Access to modular crew rest 26 is provided to offset aisleway 32 by removing at least one standard bunk 40 (shown in phantom) from overhead crew rest 16. An escape hatch 24 is provided forward of offset aisleway 32 for additional access to modular crew rest 26.

Figure 4:
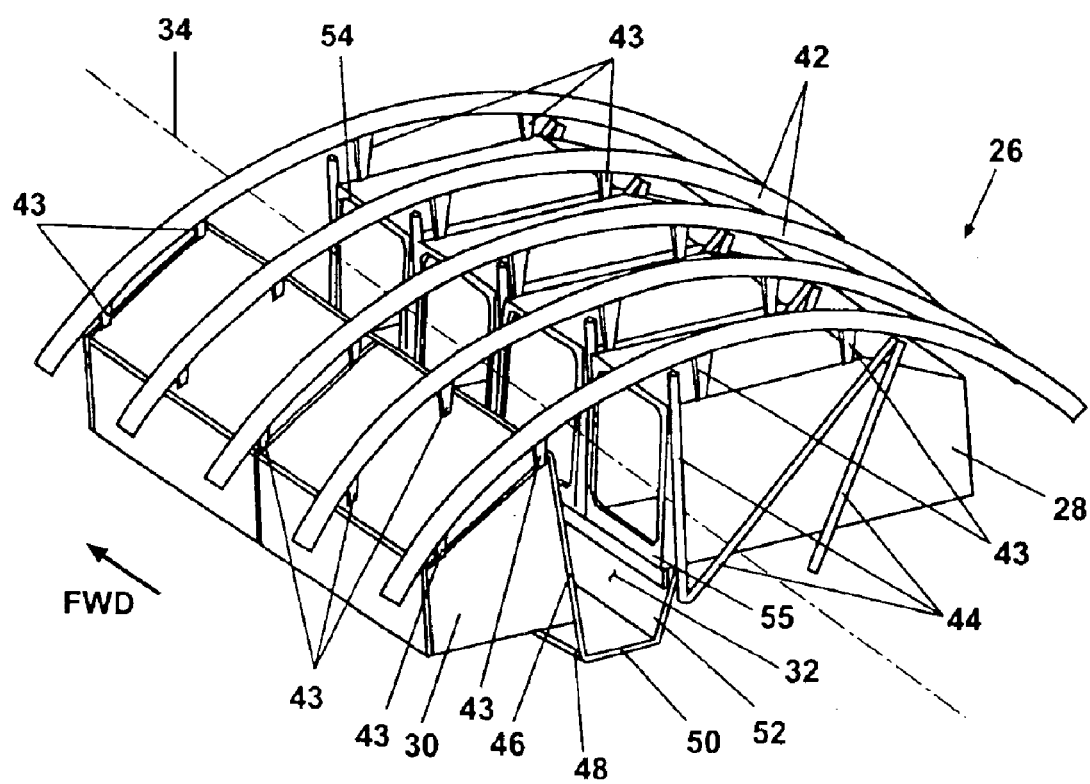
FIG. 4 is a partial perspective view of a preferred embodiment of a modular crew rest of the present invention.

As best seen in FIG. 4, each bunk module 28 and 30 is individually installed. Offset aisleway 32 is then assembled and connected to each bunk module 28 and 30 to support offset aisleway 32. Bunk modules 28 and 30 are directly supported from frames 42. A plurality of connecting members 43 mechanically join bunk modules 28 and 30 to frames 42 (or similar outer envelope structure of the vehicle).

An existing set of tie rods 44 and the structure of passenger area ceiling 18 are shown for information only. Other items (shown and described in reference to FIG. 9), such as system piping and electrical cabling, are commonly installed in the overhead area and normally adjacent aircraft centerline 36. Bunk modules 28 and 30, and offset aisleway 32 are positioned and supported independent of existing tie rods 44, the structure of passenger area ceiling 18 and systems in the overhead spaces. Bunk modules 28 and 30, and offset aisleway 32 therefore act as modular units, advantageously utilizing existing space in the overhead area of aircraft 10, between frames 42 in aft section 12, without increasing the load on passenger area ceiling 18 or displacing adjacent systems.

A face frame 46 of each bunk module 30 operably forms an outer wall of offset aisleway 32. A plurality of aisleway members 48 join a distal end of each face frame 46 to an under surface of bunk module 30. An aisleway floor 50 is connectably joined to the distal end of face frame 46 at a first end and to an aisleway member 52 at a second end. Aisleway member 52 is connectably joined to each bunk module 28. Offset aisleway 32 is therefore entirely supported by bunk modules 28 and bunk modules 30. FIG. 4 also shows that each bunk module 28 is provided with a bunk access opening 54 in an end face frame 55 for personnel to enter/exit the bunk module. The size of bunk access opening 54 allows personnel to enter in either a feet-first or a head-first orientation.

Figure 5:
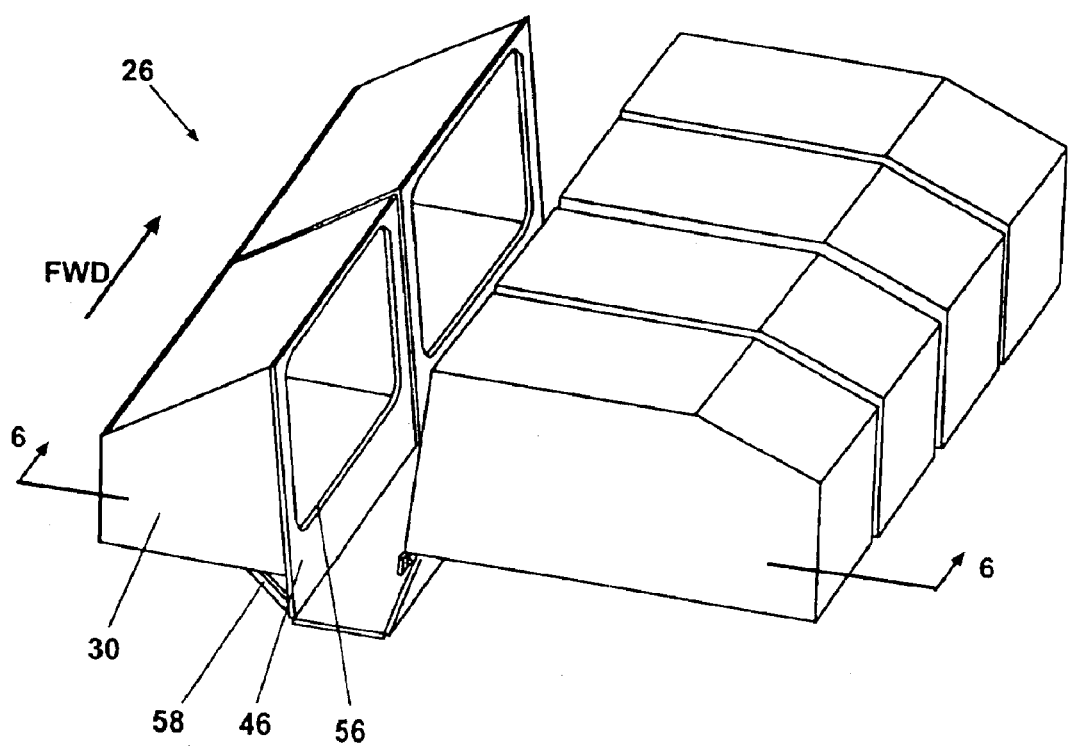
FIG. 5 is a perspective view similar to FIG. 4, partially rotated to show longitudinal-running bunk modules of the present invention.

As seen in FIG. 5, face frames 46 of bunk modules 30 are provided with a longitudinal-oriented bunk access opening 56. The longitudinal-orientated bunk access opening allows personnel to enter/exit bunk modules 30 from either a forward end or an aft end of bunk modules 30. Individual braces 58 support each face frame 46 to the undersurface of each bunk module 30.

Figure 6:
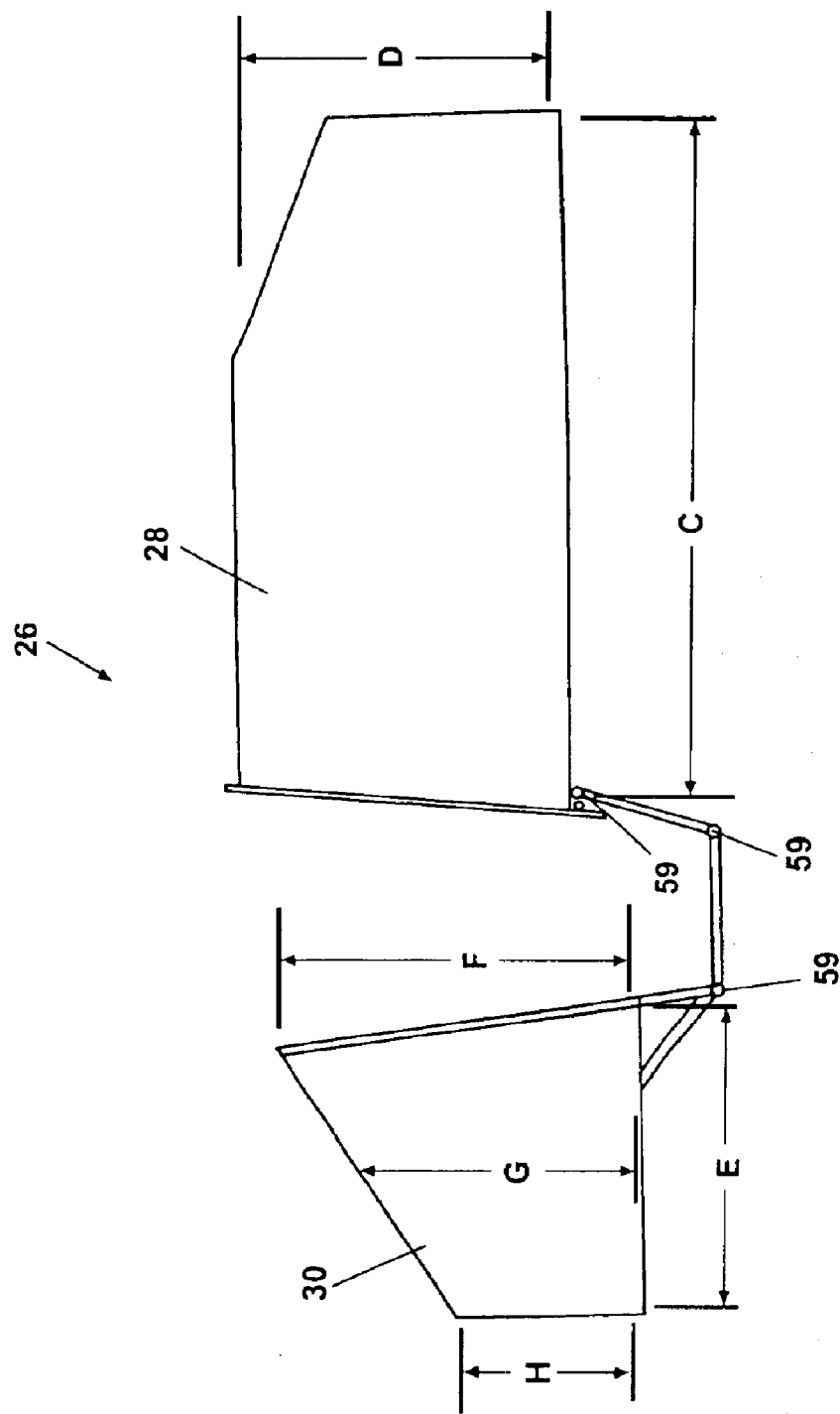
FIG. 6 is an elevational view taken at view 6—6 of FIG. 5.

Referring next to FIG. 6, each bunk module 28 has a bunk length "C" and a bunk height "D". Bunk length "C" can vary depending upon the geometry of the individual aircraft 10, but includes a nominal dimension of approximately 2.03 meters (80 inches). Bunk module 30 includes a bunk depth "E", a bunk entrance height "F", a bunk center height "G", and a bunk minimum height "H". Both bunk module 28 and bunk module 30 are provided with tapering areas in the overhead surface to accommodate the geometry of frames 42 (shown in FIG. 4). A plurality of motion joints 59 are also shown in FIG. 6. Motion joints 59 permit aisleway floor 50 to translate in at least an athwartship direction to accommodate aircraft loads and deflection of frames 42, as well as differences in vertical displacement between bunk modules 28 and bunk modules 30, respectively. Motion joints 59 can also be provided as hinged joints, ball-joints or other deflection joints to permit relative motion between offset aisleway 32 and either bunk modules 28 or 30.

Figure 7:
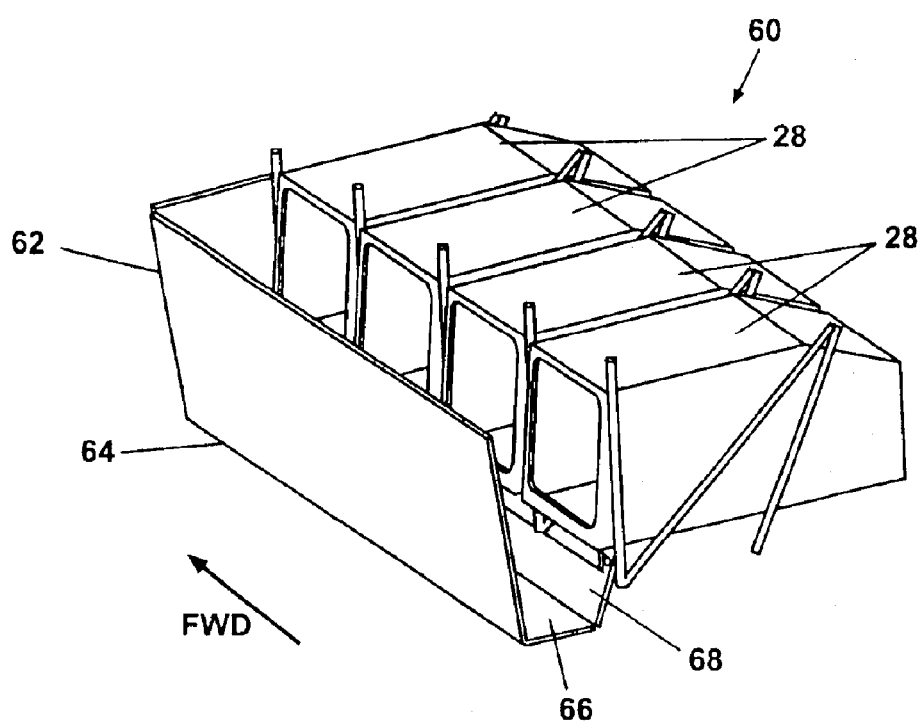
FIG. 7 is a perspective view of another embodiment for a modular crew rest of the present invention.

Referring to FIG. 7, in another preferred embodiment, a modular crew rest 60 includes an offset aisleway 62 having an aisleway wall 64 replacing case frames 46 (shown in FIG. 5). Bunk modules 30 are not used in this embodiment. An aisleway floor 66 is joined to both an aisleway wall 64 and an aisleway member 68 using motion joints similar to motion joint 59 shown in FIG. 6. Aisleway member 68 is rotatably or otherwise deflectably connected to each of the plurality of bunk modules 28 of modular crew rest 60. In the embodiment shown, modular crew rest 60 uses four bunk modules 28. Modular crew rest 60 is advantageously used where overhead space does not exist outboard of aisleway wall 64 for application of bunk modules arranged in a fore/aft direction such as bunk modules 30.

Figure 8:
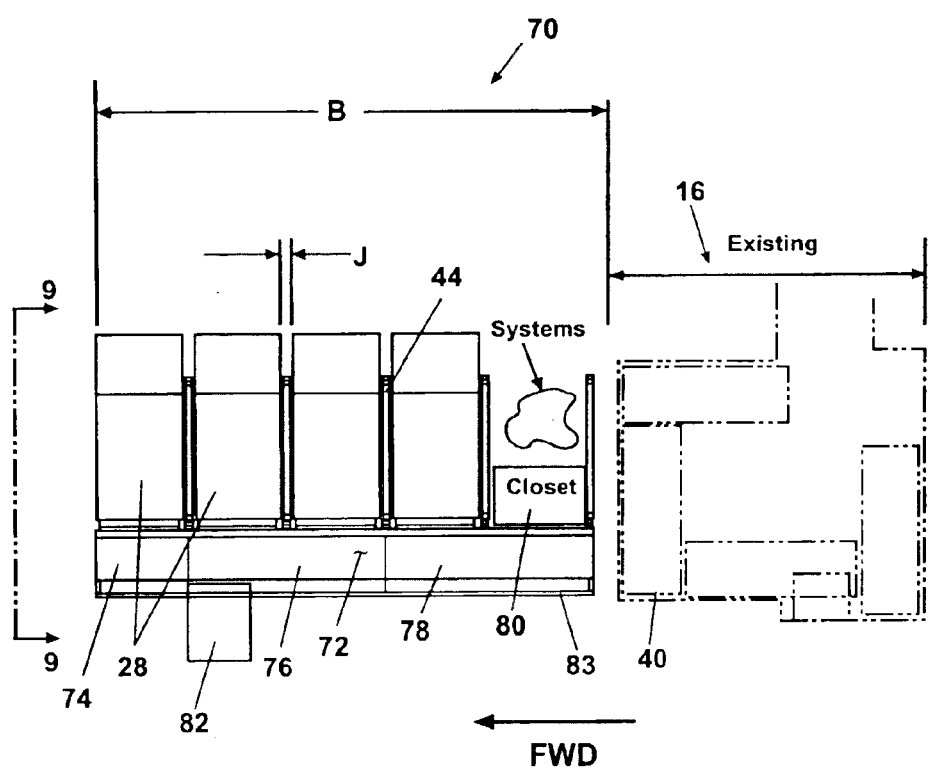
FIG. 8 is a plan view of the modular crew rest shown in FIG. 7.

Referring now to FIG. 8, in still another preferred embodiment, a modular crew rest 70 is similar to modular crew rest 60 shown in FIG. 7. Modular crew rest 70 includes an offset aisleway 72 having a first section 74, a second section 76, and a third section 78, respectively. A quantity of four bunk modules 28 are used. A closet 80 and a segment of aircraft system equipment is located in the space otherwise occupiable by a fifth one of bunk modules 28. Modular crew rest length "B" in this embodiment therefore accommodates four bunk modules 28 adjacent to existing equipment of aircraft 10. An escape hatch 82 is positioned outboard of offset aisleway 72 and is accessible via an opening (not shown) in an outboard wall 83 of offset aisleway 72. Similar to modular crew rest 26 shown in FIG. 3, offset aisleway 72 is accessible from existing crew rest 16 by removal of standard bunk 40. FIG. 8 also demonstrates a typical spacing between bunk modules 28. Bunk module spacing "J" has a typical dimension of approximately 10.2 cm (4 inches) permitting clearance to tie rods 44. Bunk module spacing "J" can vary where no tie rods 44 are present, or if another structure is present between bunk modules 28.

Figure 9:
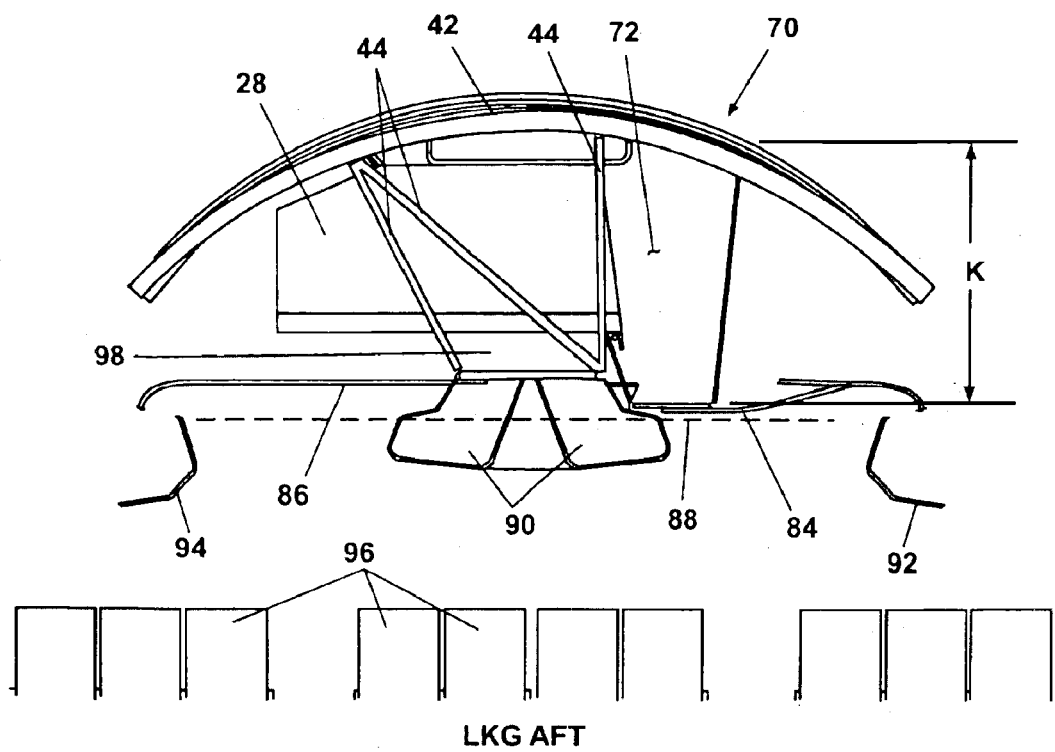
FIG. 9 is a partial sectioned view taken at section 9—9 of FIG. 8.

As best seen in FIG. 9, bunk modules 28 of modular crew rest 70 are elevated as close as possible to frames 42 to maximize available internal crew rest volume. Offset aisleway 72 provides an aisleway height "K" of approximately 152.4 cm (60 inches), sufficient for personnel to access any of bunk modules 28 without hindrance from frames 42. Aisleway height "K" can also vary in different vehicle designs and to account for different minimum headroom requirements. To accommodate modular crew rest 70, a modified ceiling 84 is provided. Modified ceiling 84 contrasts with an elevation and design of a standard ceiling 86. The elevation of an aft crew rest floor 88 for a known overhead crew rest 16 is shown in phantom for reference purposes. A plurality of inboard stowage bins 90 are independent of modular crew rest 70, leaving clearance to an underside of offset aisleway 72. A plurality of port stowage bins 92 and a plurality of starboard stowage bins 94 are also shown for information. A plurality of passenger seats 96 are also shown for reference. As shown in FIG. 9, tie rods 44 support inboard stowage bins 90, in addition to modified ceiling 84 and standard ceiling 86, respectively. The exemplary modular crew rest 70, similar to other preferred embodiments of the present invention, can therefore be installed with minimal impact on the existing arrangement of aircraft 10.

Figure 10:
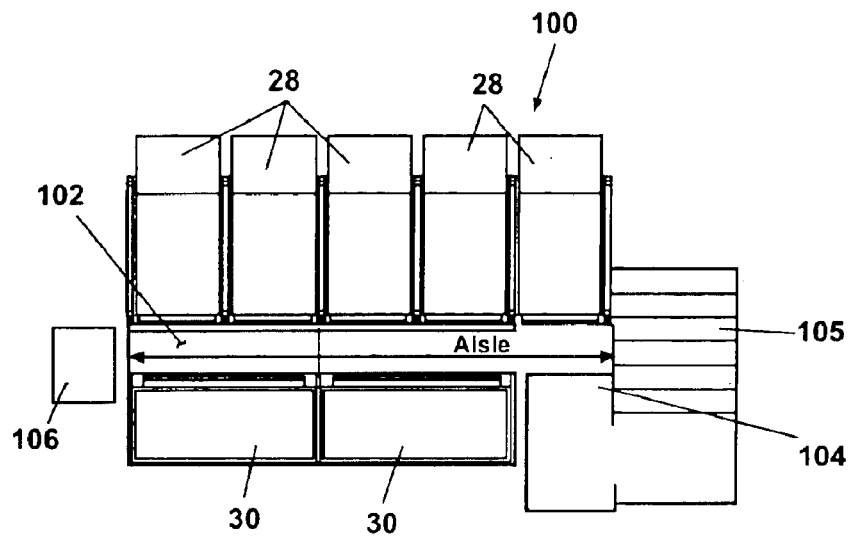
FIG. 10 is a plan view of still another preferred embodiment for a modular crew rest of the present invention.

Referring now to FIG. 10, a modular crew rest 100 includes five exemplary bunk modules 28 and two bunk modules 30, separated by an offset aisleway 102. Access to modular crew rest 100 is provided via an entrance enclosure 104 reached via a set of entrance steps 105. An escape hatch 106 is also provided at a forward end of offset aisleway 102.

Figure 11:
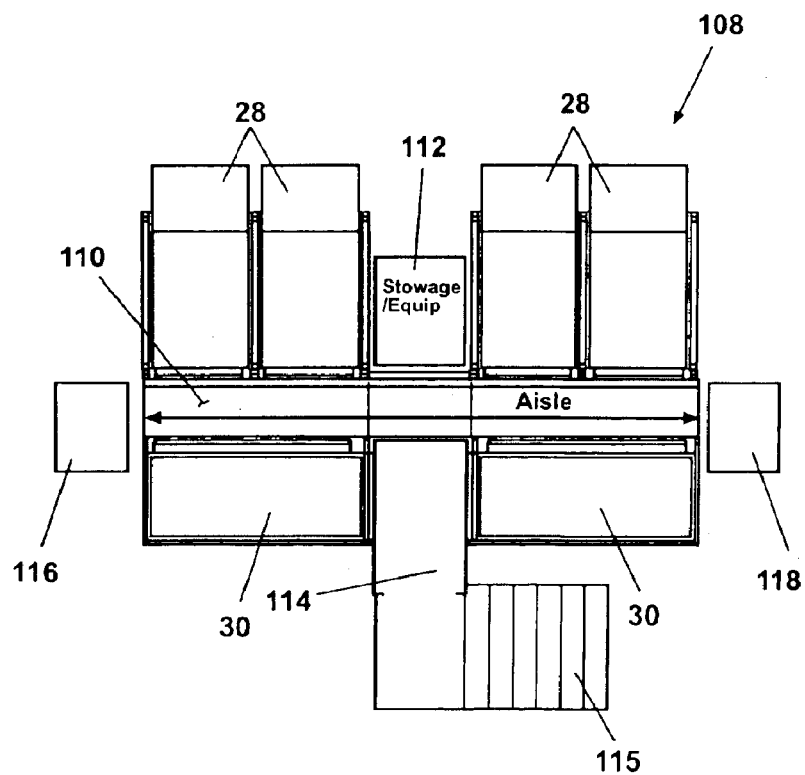
FIG. 11 is a plan view of still yet another preferred embodiment of a modular crew rest of the present invention.

Referring next to FIG. 11, a modular crew rest 108 provides two pairs of bunk modules 28 and two individual bunk modules 30 separated by an offset aisleway 110. Each pair of bunk modules 28 are separated by a stowage space 112. Similarly, the two bunk modules 30 are separated by an entrance enclosure 114 with a set of entrance steps 115 for accessing modular crew rest 108. A forward access hatch 116 and an aft access hatch 118 are provided at opposed ends of offset aisleway 110, for entry/exit to/from modular crew rest 108 if access via entrance enclosure 114 is unavailable and in the event that access via an existing crew rest aisleway is also unavailable.

Figure 12:
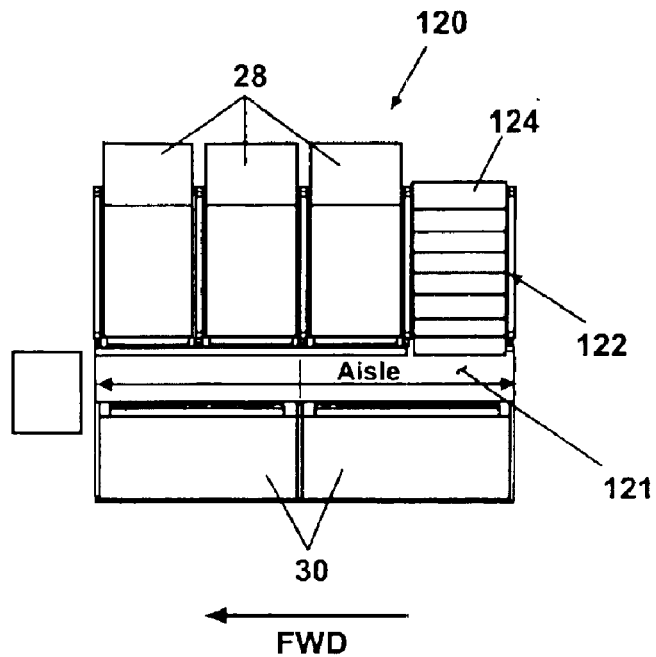
FIG. 12 is a plan view of yet another preferred embodiment for a modular crew rest of the present invention accessible by a staircase.

Referring to FIG. 12, a modular crew rest 120 provides three bunk modules 28 and a pair of bunk modules 30 separated by an offset aisleway 121. Access to modular crew rest 120 is provided via an entrance enclosure 122 having a set of entrance steps 124 positioned generally in parallel with each of the bulk modules 28.

Figure 13:
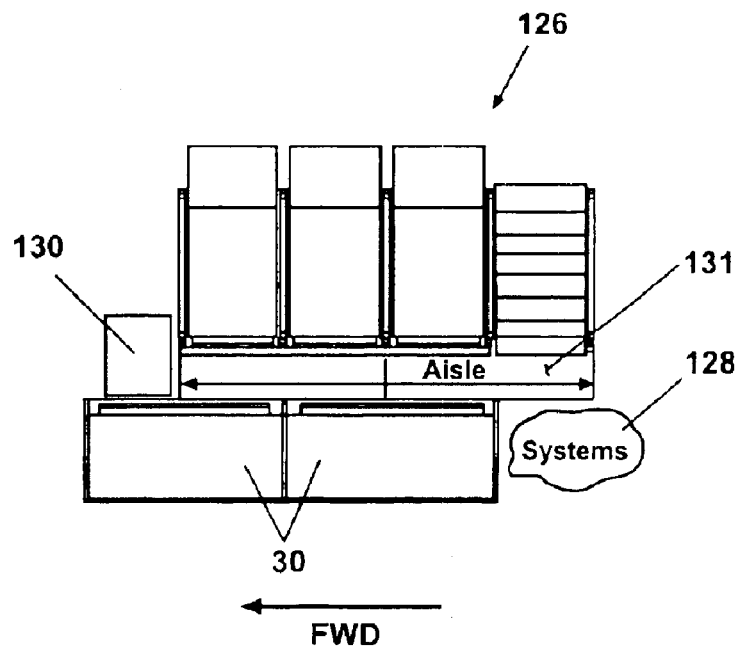
FIG. 13 is a plan view of a modular crew rest similar to FIG. 12, modified to account for a systems installation adjacent to longitudinal-running bunk modules of the present invention.

FIG. 13 identifies a modular crew rest 126 which is similar to modular crew rest 120 shown in FIG. 12, differing in that the pair of bunk modules 30 are arranged further forward from modular crew rest 120 to accommodate a system configuration 128 of aircraft 10. An access hatch 130 is also provided at a forward end of an offset aisleway 131.

Figure 14:
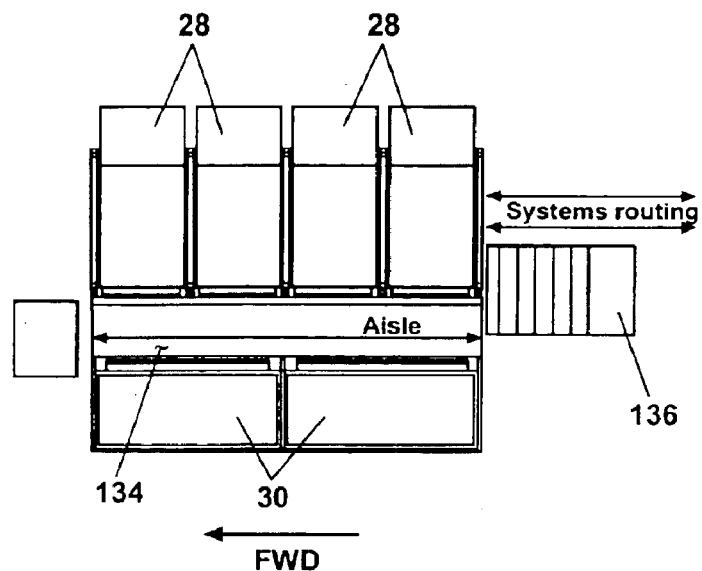
FIG. 14 is a plan view of still another preferred embodiment of a modular crew rest of the present invention, similar to FIG. 12, accessible by a fore/aft-running staircase.

As shown in FIG. 14, a modular crew rest 132 includes four bunk modules 28 and a pair of bunk modules 30 separated by an offset aisleway 134. A set of access steps 136, arranged generally fore/aft, provides personnel access to offset aisleway 134. Access steps 136 are arranged to avoid existing systems routing such as pipes or cabling in aircraft 10. Modular crew rest 132 is generally configured forward of an existing overhead crew rest 16, allowing use of access steps 136 when existing crew rest aisleway to offset aisleway connectivity is not available.

Figure 15:
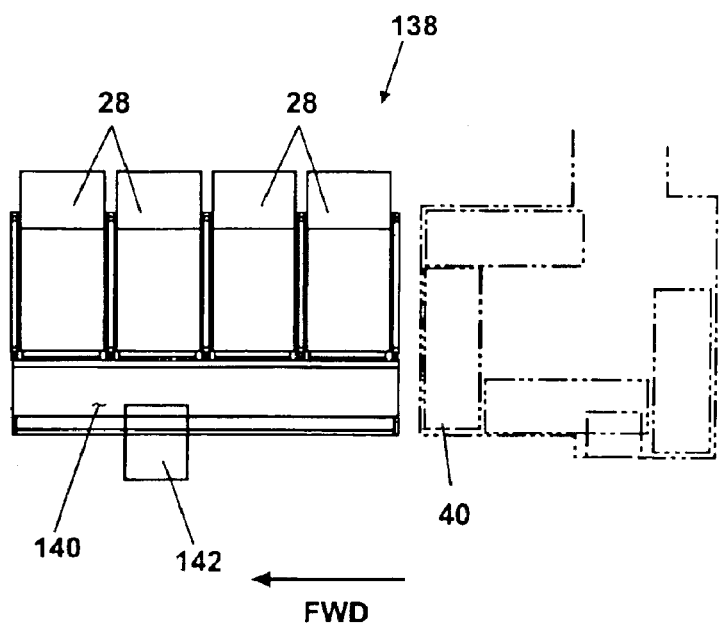
FIG. 15 is plan view of yet another preferred embodiment of a modular crew rest of the present invention, similar to the arrangement of FIG. 14, having an offset aisleway accessible from an existing crew rest area by removal of bunks in the existing crew rest area.

As seen in FIG. 15, a modular crew rest 138 provides only four bunk modules 28 adjacent to an offset aisleway 140. An access hatch 142 is provided outboard of offset aisleway 134 in addition to personnel access provided into offset aisleway 140 by removing standard bunk 40 similar to previous modular crew rest designs.

Figure 16:
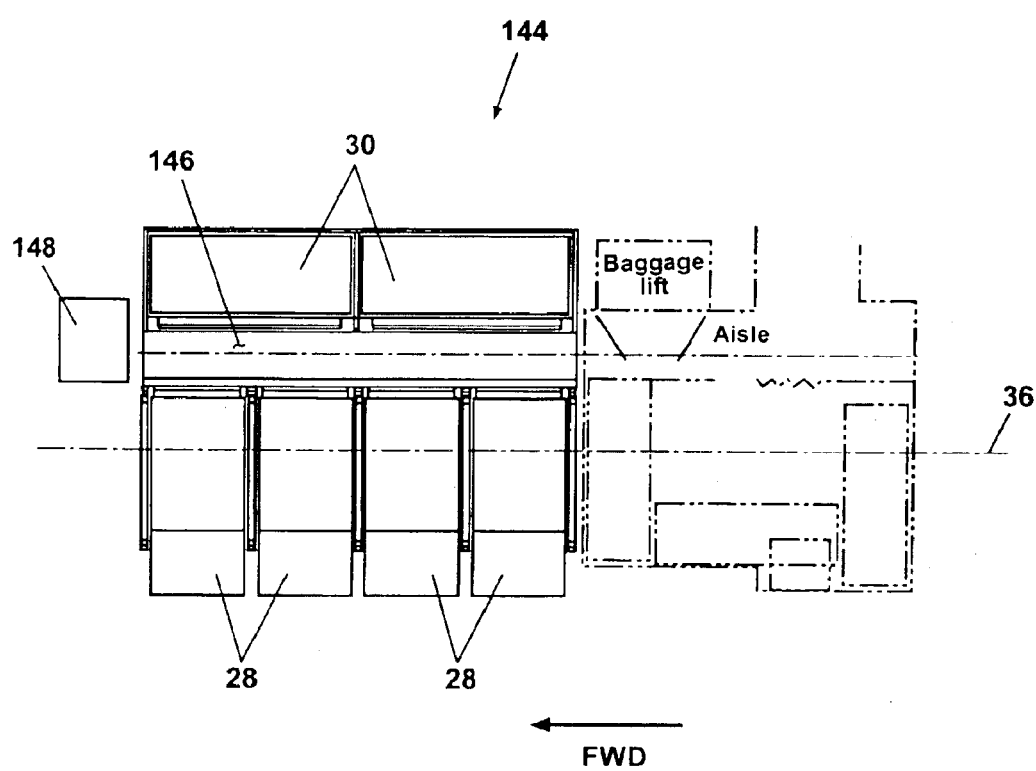
FIG. 16 is a plan view of another preferred embodiment of the present invention having an offset passageway arranged on a starboard side of the aircraft centerline accessible from an existing crew rest area by removal of bunks in the existing crew rest area.

As seen in FIG. 16, a modular crew rest 144 differs from the previous embodiments in that modular crew rest 144 provides a starboard offset aisleway 146. Modular crew rest 144 therefore provides a configuration utilizing space on a starboard side of an aircraft 10. Similar to previous embodiments, modular crew rest 144 provides four bunk modules 28 and two bunk modules 30, respectively. An access hatch 148 is also provided at a forward end of starboard offset aisleway 146. Any of the previous modular crew rest designs can also be modified to suit a starboard installation.

Figure 17:
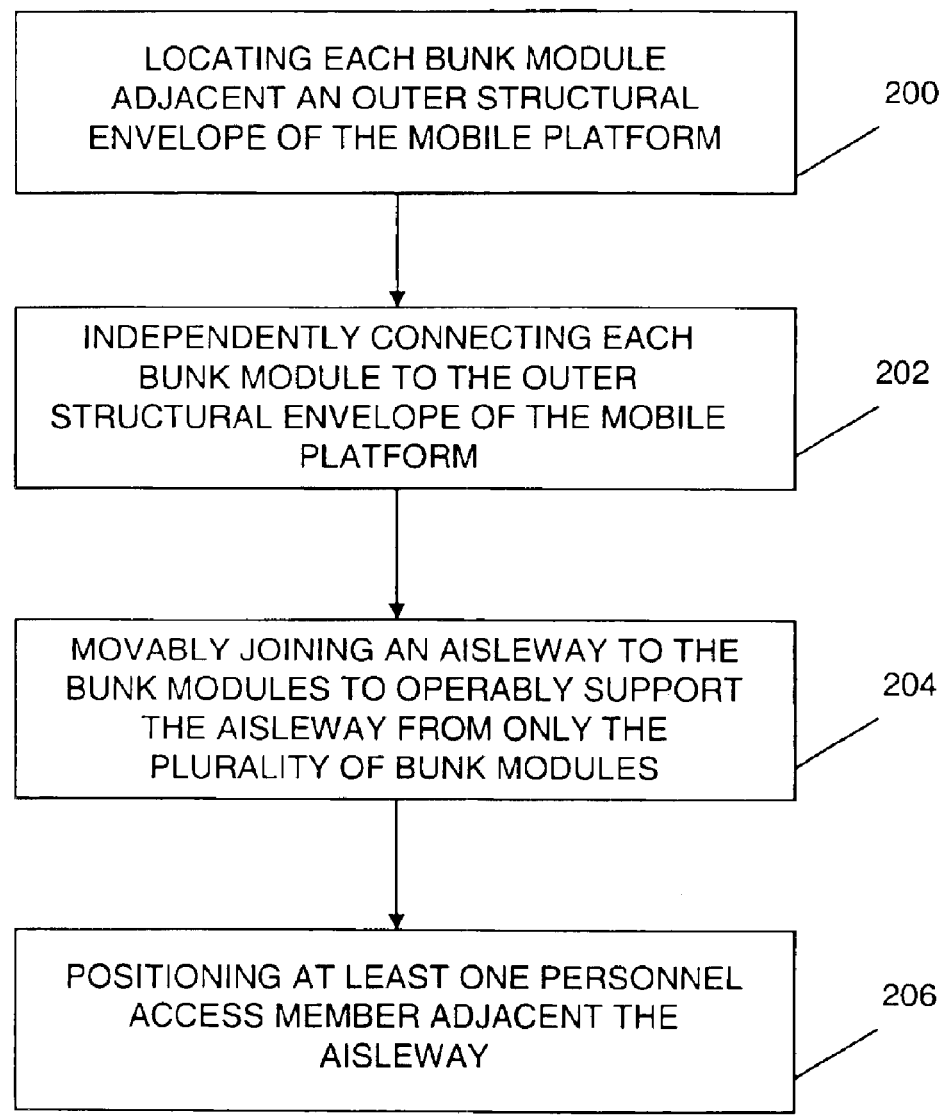
FIG. 17 is a flow diagram of exemplary operations to install a modular crew rest of the present invention.

Referring finally to FIG. 17, the operations to install a modular crew rest of the present invention are detailed. In an operation 200, each bunk module is located adjacent an outer structural envelope of the mobile platform. In an operation 202, each bunk module is independently connected to the outer structural envelope of the mobile platform. In an operation 204, an aisleway is movably joined to the bunk modules to operably support the aisleway from only the plurality of bunk modules. In operation 206, at least one personnel access member is positioned adjacent the aisleway.

Material for bunk modules 28 and 30 is generally a polymeric material such as fiberglass or composite material applied in one or more sheets to form individual walls or the entire enclosure perimeter of bunk modules 28 and 30.

Material for connecting members 43 is preferably a metal. Polymer or composite material can also be used if load conditions permit. Exemplary materials include, but are not limited to aluminum and steel. Connecting members 43 are joined to frames 42 (or similar vehicle structure) using known techniques, including fastening, welding, riveting, adhesives, etc. Material for the offset aisleways is preferably a light weight metal such as aluminum, but can also be steel, composites and/or polymeric material. It is also possible to combine different materials for bunk modules 28 and 30, for example using metal for the face frames 46 and 55 or metal bonded to fiberglass, and fiberglass for the remaining body portions, or any similar combination. Use of polymeric material for the bunk modules 28 and 30 inherently provides sound damping, to decrease the noise level within each module.

Reference herein to aircraft frames also generally applies to outer structure, such as I-beams, H-beams, channels, U-shaped members, plate, etc. used to form the outer support structure for any applicable vehicle. The modular attachment of modular crew rests of the present invention is not limited by the design or shape of the connecting structure of the vehicle outer framework.

Modular crew rests of the present invention provide several advantages. By modularizing bunks and offsetting the passageway, impact on existing components, structure and systems is reduced. Bunk modules of the present invention are separately supported from individual frames (or similar structure of the vehicle) thereby permitting installation of these bunk modules as a retrofit or enhancement of an existing vehicle design. By enlarging the size and therefore the opening aperture of the bunk modules of the present invention, personnel can access the individual bunk modules head-first rather than feet-first previously required in other existing crew rest areas. By offsetting the aisleway of the present invention, access to the bunk modules is provided without interfering with commonly centralized systems including piping and wireways. By providing motion joints for the offset aisleways of the present invention, the offset aisleways can be connected after installation of the bunk modules and still allow for deflection of aircraft frames and associated equipment. Also, by supporting modular crew rests of the present invention from outer vehicle structure instead of existing passenger area ceiling structure, impact on the ceiling structure is reduced.

While various preferred embodiments have been described, those skilled in the art will recognize modifications or variations which might be made without departing from the inventive concept. The examples illustrate the invention and are not intended to limit it. Therefore, the description and claims should be interpreted liberally with only such limitation as is necessary in view of the pertinent prior art.

What is claimed is:

1. A modular crew rest system, comprising:
   a mobile platform having a plurality of frames and a longitudinal centerline;
   a plurality of bunk modules each independently connected to the frames;
   a passageway connectable to the bunk modules, the passageway having a passageway centerline longitudinally offset from the mobile platform longitudinal centerline and at least one flexible joint;
   wherein the plurality of bunk modules is configurable in at least one of a first group of modules and a second group of modules.

2. The system of claim 1, comprising at least one access hatch positioned adjacent the passageway.

3. The system of claim 1, wherein each bunk module comprises a polymeric material.

4. The system of claim 3, wherein the polymeric material comprises a fiberglass composite.

5. The system of claim 1, comprising a plurality of frame pairs operable to support each bunk module.

6. The system of claim 5, wherein each bunk module is operably supported by one of the frame pairs comprising alternate ones of the plurality of frames.

7. The system of claim 1, wherein each bunk module comprises a plurality of longitudinal module walls joined to a closed end wall.

8. The system of claim 7, comprising a frame panel defining an access aperture, the frame panel operably forming an entrance end of the bunk module oppositely positioned from the closed end wall.

9. The system of claim 7, wherein at least one module wall of each bunk module is adaptably shaped to conform to an aft geometry of the mobile platform.

10. The system of claim 1, wherein the passageway comprises at least a first side, a walking platform adapted for flexible connection to the first side, and a second side adapted for flexible connection to the walking platform and oppositely positioned from the first side.

11. The system of claim 1, comprising a crew rest arrangement having each of the bunk modules of the first group positioned substantially perpendicular to the longitudinal centerline, and each of the bunk modules of the second group positioned substantially parallel to the longitudinal centerline.

12. The system of claim 1, wherein the passageway comprises a plurality of walking platform sections.

13. A mobile platform crew rest system, comprising:
    a mobile platform having a plurality of frames and a longitudinal centerline;
    a plurality of bunk modules each having a plurality of longitudinal module walls joined to a closed end wall;
    a plurality of pairs of the frames operably supporting at least one of the bunk modules; and
    a passageway having a plurality of segments and a passageway centerline longitudinally offset from the mobile platform longitudinal centerline, the passageway being operably connectable to the plurality of bunk modules;
    wherein the plurality of bunk modules is configurable in at least one of a first group of athwartship oriented modules and a second group of fore-aft oriented modules.

14. The system of claim 13, comprising a motion joint operably joining adjacent ones of the plurality of segments of the passageway.

15. The system of claim 13, wherein each of the pairs of the frames comprises alternate ones of the frames.

16. The system of claim 13, wherein the plurality of bunk modules is located in an aft, upper end of the mobile platform.

17. The system of claim 13, comprising a frame panel defining an access aperture, the frame panel operably forming an entrance end of each bunk module oppositely positioned from the closed end wall.

18. A method for forming a modular crew rest for a mobile platform having a plurality of modular bunk modules, the method comprising:
    locating each bunk module adjacent an outer structural envelope of the mobile platform;

independently supporting each bunk module to the outer structural envelope of the mobile platform;

movably joining an aisleway to the bunk modules to operably support the aisleway from only the plurality of bunk modules; and positioning at least one personnel access member adjacent the aisleway.

19. The method of claim 18, comprising positioning each bunk module between existing deck support structural members.

20. The method of claim 18, comprising fastenably joining each bunk module to the outer structural envelope of the mobile platform.

21. The method of claim 18, comprising mechanically joining each bunk module to the outer structural envelope of the mobile platform.

22. The method of claim 18, comprising forming each bunk module from at least one layer of polymeric material.

23. The method of claim 18, comprising hinging the aisleway to the plurality of bunk modules.

24. The method of claim 18, comprising constructing the aisleway using an aisleway floor member movably joined to at least one aisleway wall section.

25. The method of claim 18, comprising removing at least one bunk from an adjoining crew rest to provide personnel access to the aisleway.

26. The method of claim 18, comprising arranging the plurality of bunk modules into at least a first group and a second group of bunk modules.

27. The method of claim 26, comprising:

aligning each bunk module of the first group substantially perpendicular to a mobile platform longitudinal centerline; and arranging each bunk module of the second group substantially parallel to the mobile platform longitudinal centerline.

28. The method of claim 27, comprising positioning the aisleway between the first group and the second group of the bunk modules such that an aisleway longitudinal centerline is laterally offset, from the mobile platform longitudinal centerline.

29. The method of claim 18, comprising aligining the aisleway with a set of stairs for aisleway access.

30. The method of claim 18, comprising aligining the aisleway with a hatch for aisleway access.

31. The method of claim 18, comprising creating a personnel access aperture in each bunk module permitting one of a feet-first and a head-first personnel access orientation to the bunk module.

32. The method of claim 18, comprising positioning the modular crew rest above a passenger area ceiling.

* * * * *